United States Patent
Goldberg et al.

(10) Patent No.: US 9,743,017 B2
(45) Date of Patent: Aug. 22, 2017

(54) INTEGRATED MOBILE DESKTOP

(71) Applicant: Lattice Semiconductor Corporation, Portland, OR (US)

(72) Inventors: Marshall Goldberg, Alameda, CA (US); Wooseung Yang, San Jose, CA (US); Ju Hwan Yi, Sunnyvale, CA (US); Seung Jong Lee, Santa Clara, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 953 days.

(21) Appl. No.: 13/940,038

(22) Filed: Jul. 11, 2013

(65) Prior Publication Data

US 2014/0016037 A1    Jan. 16, 2014

Related U.S. Application Data

(60) Provisional application No. 61/671,590, filed on Jul. 13, 2012.

(51) Int. Cl.
  *G06F 15/173* (2006.01)
  *H04N 5/265* (2006.01)
  *G06F 9/44* (2006.01)

(52) U.S. Cl.
  CPC ........... *H04N 5/265* (2013.01); *G06F 9/4445* (2013.01)

(58) Field of Classification Search
  CPC ........... G09G 2370/12; G09G 2370/04; G09G 5/363; G06F 3/1423; H04L 67/125
  See application file for complete search history.

(56) References Cited

U.S. PATENT DOCUMENTS

| | | | |
|---|---|---|---|
| 2003/0100963 A1* | 5/2003 | Potts | G06F 3/1438 700/83 |
| 2003/0135742 A1 | 7/2003 | Evans | |
| 2006/0028583 A1* | 2/2006 | Lin | G09G 5/14 348/584 |
| 2007/0124372 A1* | 5/2007 | Liu | G06F 3/023 709/204 |

(Continued)

FOREIGN PATENT DOCUMENTS

| | | |
|---|---|---|
| CN | 101625631 A | 1/2010 |
| CN | 102007482 A | 4/2011 |

(Continued)

OTHER PUBLICATIONS

DisplayPort(TM) Ver. 1.2 Overview, DisplayPort Developer Conference, Dec. 6, 2010, Taipei, 33 pages.

(Continued)

*Primary Examiner* — Yves Dalencourt
(74) *Attorney, Agent, or Firm* — Fenwick & West LLP

(57) ABSTRACT

Embodiments of the invention are generally directed to an integrated mobile desktop. An embodiment of an apparatus includes a display chip to receive graphical data and produce video display signals; and a logic chip to receive data from a mobile device and the video display signals from the display chip to generate a display including at least a portion for a representation of a display of the mobile device. The logic chip provides for integration of operations for the apparatus and the mobile device using the generated display.

20 Claims, 8 Drawing Sheets

(56) References Cited

U.S. PATENT DOCUMENTS

| | | | |
|---|---|---|---|
| 2007/0165038 A1* | 7/2007 | Chiba | G06F 21/10 345/520 |
| 2008/0305742 A1* | 12/2008 | Basir | G06F 3/1454 455/41.2 |
| 2009/0097817 A1 | 4/2009 | Bach | |
| 2009/0182546 A1 | 7/2009 | Gentric | |
| 2009/0248820 A1* | 10/2009 | Basir | B60K 35/00 709/206 |
| 2009/0265645 A1 | 10/2009 | Park et al. | |
| 2010/0011055 A1 | 1/2010 | Lin et al. | |
| 2010/0172630 A1* | 7/2010 | Chou | G11B 20/00086 386/252 |
| 2011/0112819 A1* | 5/2011 | Shirai | G06F 9/4445 703/21 |
| 2011/0119666 A1 | 5/2011 | Flynn | |
| 2011/0181492 A1 | 7/2011 | Soeda | |
| 2012/0003960 A1 | 1/2012 | Parmar et al. | |
| 2012/0030584 A1* | 2/2012 | Bian | G06F 9/4443 715/746 |
| 2012/0075204 A1* | 3/2012 | Murray | G06F 3/0416 345/173 |
| 2012/0088548 A1* | 4/2012 | Yun | G08C 17/02 455/557 |
| 2012/0143944 A1* | 6/2012 | Reeves | H04L 67/1095 709/203 |
| 2013/0024812 A1* | 1/2013 | Reeves | G06F 3/1423 715/810 |
| 2013/0027289 A1* | 1/2013 | Choi | G06F 3/14 345/156 |
| 2013/0278484 A1* | 10/2013 | Hwang | G06F 3/1423 345/2.3 |
| 2013/0346776 A1* | 12/2013 | Wang | G06F 3/14 713/323 |
| 2014/0189356 A1* | 7/2014 | Phegade | H04L 63/0428 713/171 |

FOREIGN PATENT DOCUMENTS

| | | |
|---|---|---|
| CN | 102063463 A | 5/2011 |
| DE | 202010005485 U1 | 10/2010 |
| JP | H10-191287 A | 7/1998 |
| JP | 2003-289500 A | 10/2003 |
| JP | 2006-172193 A | 6/2006 |
| JP | 2007-193741 A | 8/2007 |
| JP | 2010-020757 A | 1/2010 |
| JP | 2010-287240 A | 12/2010 |
| JP | 2011-018290 A | 1/2011 |
| JP | 2011-103119 A | 5/2011 |
| JP | 2011-154478 A | 8/2011 |
| WO | WO-2004-028152 | 4/2004 |
| WO | WO 2008/072695 A1 | 6/2008 |

OTHER PUBLICATIONS

High-Definition Multimedia Interface Specification Version 1.3, HDMD Licensing, LLC, Jun. 22, 2006, 237 pages.

International Search Report and Written Opinion of the International Searching Authority dated Oct. 24, 2013, in International Patent Application No. PCT/US2013/050380, 10 pages.

Universal Serial Bus 3.0 Specification (including errata and ECNs through May 1, 2011) Revision 1.0, Hewlett-Packard Company et al., Jun. 6, 2011, 531 pages.

Universal Serial Bus Specification Revision 2.0, Compaq et al., Apr. 27, 2000, 650 pages.

European Extended Search Report, European Application No. 13817373.7, dated Mar. 9, 2016, 8 pages.

Japanese Office Action, Japanese Application No. 2015-521865, dated Jan. 31, 2017, 7 pages.

Chinese First Office Action, Chinese Application No. 201380037122.1, dated Aug. 2, 2016, 12 pages (with concise explanation of relevance).

* cited by examiner

INTEGRATED MOBILE DESKTOP

RELATED APPLICATIONS

This application is related to and claims priority from U.S. Provisional Patent Application No. 61/671,590, filed Jul. 13, 2012, the entire contents of which are hereby incorporated by reference.

TECHNICAL FIELD

Embodiments of the invention generally relate to the field of electronic devices and, more particularly, to an integrated mobile desktop.

BACKGROUND

Handheld mobile devices, including smart phones and tablet computers, have greatly increased in usability, computing power, and storage, and are often used a substitute for a personal computer, such as a laptop or desktop computer.

However, because of their size and mobility, as well as their evolution from earlier device, mobile devices are generally based on different operating systems than personal computers, and utilize different applications. As a result, the transfer of data between mobile device and personal computer is generally awkward, requiring multiple steps to handle the transfer files between devices.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
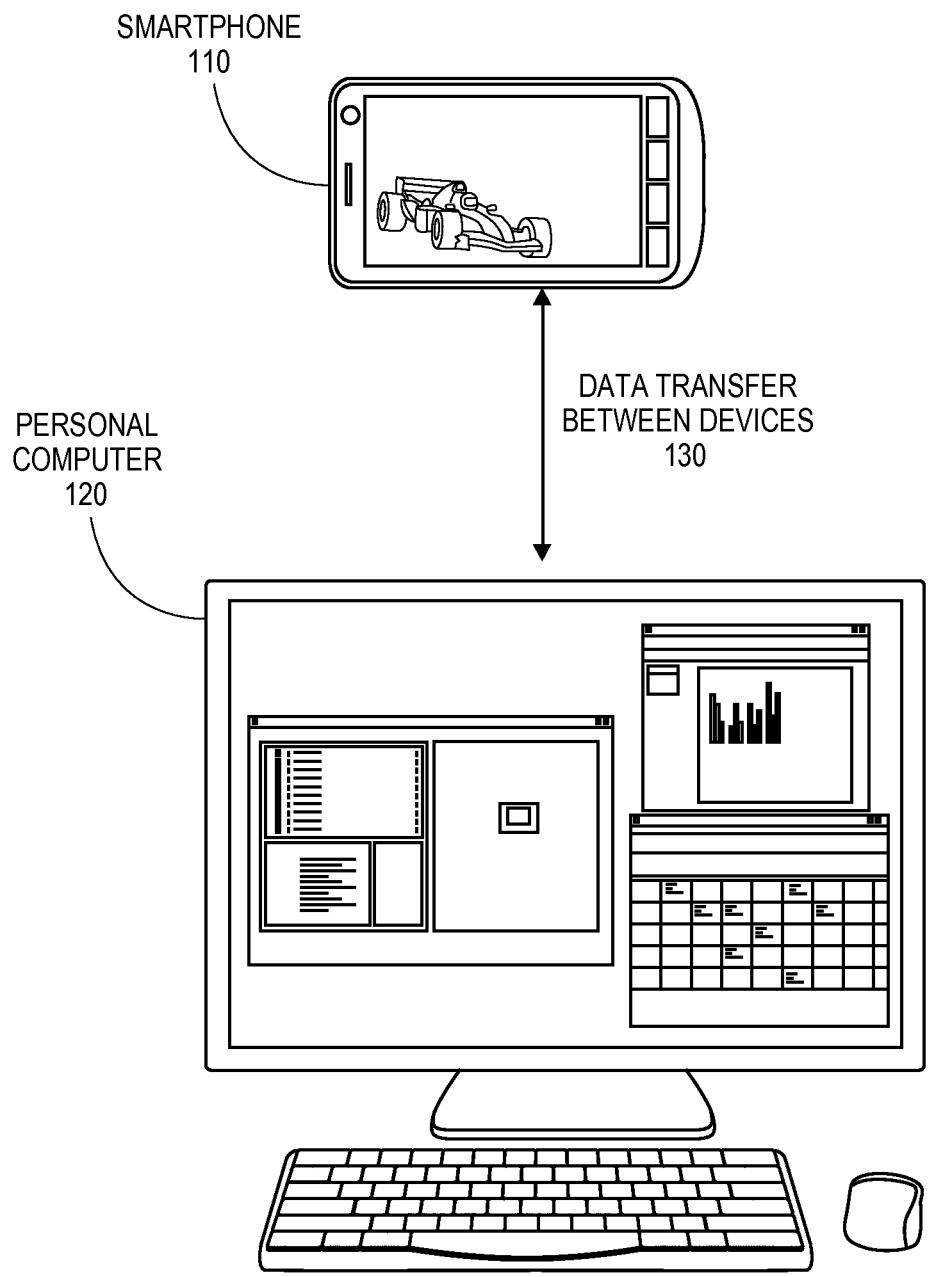
FIG. 1 is an illustration of a connection between a mobile device and a computer for data manipulation and transfer.

Embodiments of the invention are generally directed to an integrated mobile desktop.

In a first aspect of the invention, an embodiment of an apparatus includes a display chip to receive graphical data and produce video display signals; and a logic chip to receive data from a mobile device and the video display signals from the display chip to generate a display including at least a portion for a representation of a display of the mobile device. The logic chip provides for integration of operations for the apparatus and the mobile device using the generated display.

In a second aspect of the invention, an embodiment of a logic chip includes a first receiver to receive video display signals for a first apparatus; a second receiver to receive data from a second apparatus, the second receiver to separate video data and other data from the second apparatus; a decoding element to decode the video data of the second apparatus to generate video display signals for the second apparatus; and a blending element to combine the video display signals for the first apparatus with the video display signals for the second apparatus to present an integrated representation of the first apparatus and the second apparatus.

DETAILED DESCRIPTION

Embodiments of the invention are generally directed to an integrated mobile desktop platform.

As used herein:

"Mobile device" means any electronic device that may be used in a mobile operation, including a smartphone, tablet computer, handheld computing device, or other similar device.

"Computer" means any computing device or system, including a personal computer, such as a desktop or laptop computer, network server, or other similar device.

As mobile devices such as smartphones and tablets increase in power and complexity, the process of synchronizing and sharing data between the mobile device and a personal computer becomes both increasing important and increasingly difficult. While this document may refer to a personal computer as an example, the elements described herein are generally applicable to any computer.

There are two conventional methods that are generally used to address data transfer between mobile device and a computer (such as a personal computer):

(1) Attach the mobile device to the computer, such as via a USB™ (Universal Serial Bus) port or network interface, and browse the portable device from the computer as if the mobile device is a disk drive attached to the computing system; or (2) Run synchronization software on one of the mobile device or computer, where the synchronization software backs up and synchronizes files between the mobile device and the computer.

However, these solutions are incomplete because they do not address unique aspects of each application used on the mobile device, do not allow editing of content on the mobile device with the personal computer, and do not allow any direct interaction of the portable device with the personal computer.

In some embodiments, a user may attach a mobile device to a computer using an interface that combines audio/video and data. Examples of the interface include HDMI™ (High-Definition Multimedia Interface), DVI™ (Digital Visual Interface), MHL™ (Mobile High-definition Link), DisplayPort™, WirelessHD, or WiGig™ (Wireless Gigabit Alliance). Examples of a data link include USB, USB 3.0, Ethernet, WiFi, or WiGig. The combined video/data link could be created through two separate connectors, or a connection technology which transmits both audio/video and data, such as Thunderbolt™ or an enhanced, future version of one of the above interfaces, or a high speed data interface in which the audio/video signal is transmitted as either baseband or compressed video, with accompanying data.

In some embodiments, the connection of a mobile device with a computer is used to establish an integrated mobile desktop to allow access to the mobile device via the computer. In some embodiments, a video interface portion of the connection allows the video output of the portable device to appear on the computer desktop in a fixed size or resizable window, or full-screen; and a data interface portion of the connection enables the two devices to work together to describe window size and location, and allows user interface control between the computer desktop software and its applications and the mobile device's software and applications.

In some embodiments, an integrated mobile desktop enables the execution of mobile device software on the computer desktop, enables drag and drop and other easily manipulated forms of data transfer between the mobile device and the computer, allows editing of content directly on the mobile device, and otherwise enhances and integrates the smartphone "desktop" with the PC desktop. In some embodiments, the use of the integrated mobile desktop may be used to eliminate the need to browse the mobile device on the computer as if the mobile device was a storage disk, and to eliminate the need to run special synchronization software between the computer and mobile device. While use of synchronization software is still possible, it also becomes possible to drag and drop individual files between the PC and the portable device. With such data transfer, is then possible to view and edit the content on the mobile device.

In an example, a PowerPoint presentation created on a PC may be dragged to a smartphone using the integrated mobile desktop, and then the presentation may be viewed and edited on the smartphone using the PC keyboard and mouse, to ensure that the presentation works properly before taking the portable device to a business meeting.

In a particular implementation, an integrated mobile desktop system is based on MHL technology, as well as future potential enhancements that may integrate USB or WiFi with MHL. However, embodiments are not limited to this technology, and any standard video and data interfaces may be combined together with appropriate software to enable the capability.

FIG. 1 is an illustration of a connection between a mobile device and a computer for data manipulation and transfer. In this illustration, a smartphone 110 or other mobile device is coupled with an apparatus such as a personal computer 120 or other computer by an interface or the purpose of data transfer between devices 130. In some embodiments, the computer provides for an integrated mobile desktop to allow for integrated operations between the computer and mobile device.

Figure 2:
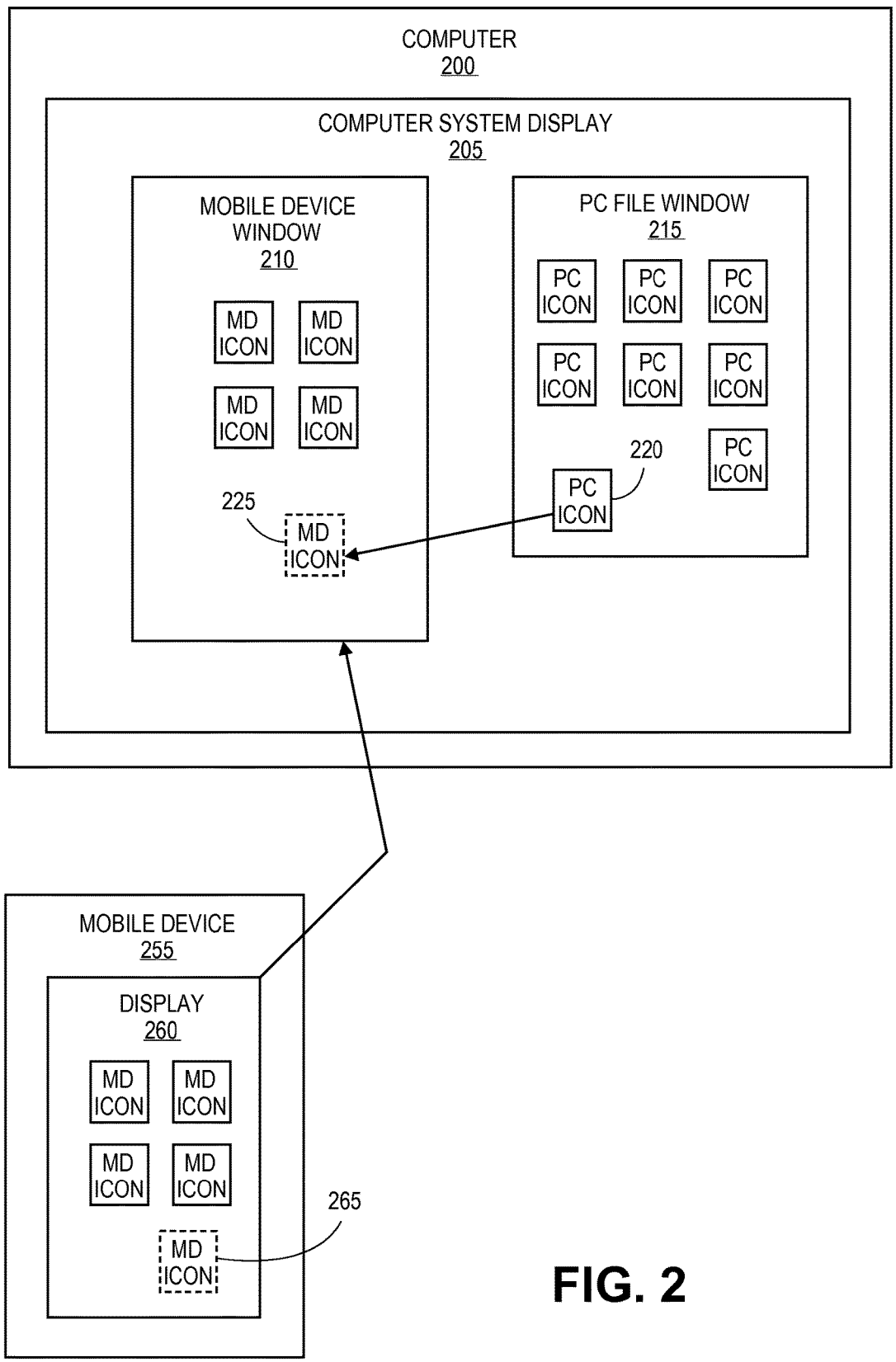
FIG. 2 is an illustration of an embodiment of an integrated mobile desktop.

FIG. 2 is an illustration of an embodiment of an integrated mobile desktop. In some embodiments, the desktop allows for integration of operations between a first device (such as a personal computer) and a second device (such as a mobile device). In this illustration, a computer system display 205 of a computer 200 (where the computer is not otherwise illustrated) includes a mobile device window 210 that provides a representation of a display 260 of a mobile device 255. The mobile device window 210 is shown as a certain size and shape for illustration, but the window may be adjusted in size and shape. In certain circumstances, the mobile device window 210 may be a full screen display, and thus take up all of the area of the computer system display 205. In the mobile device window 210 and the display 260 of the mobile device 255, "MD Icon" refers to a mobile device icon, which is an icon representing a file, application, or other element in the operating system of the mobile device 255. In some embodiments, the mobile device window 210 may open upon the connection of the mobile device 255 to the computer after a discovery and negotiation process between the mobile device and the computer.

As further illustrated, the computer system display may include normal or native display elements of the computer as well as the mobile device window 210. In an example, the computer system display may include a file folder window such as PC file window 215, which as illustrated as including multiple personal computer icons (designated as "PC Icons"). In some embodiments, the integrated mobile desktop allows use of the computer to manipulate elements of the mobile device, such the use of the computer's human interface features, including the mouse (or other pointing device) and keyboard of the computer, for such manipulation. In an example, the movement of icons on the mobile device window may result in movement in the display 260, and the copying, deletion, or creation of data elements using the computer and mobile device window 210 results on such actions occurring on the mobile device 255.

In some embodiments, the integrated mobile desktop further allows for integrated manipulation of data elements between the computer and the mobile device, where such manipulation may generate changes at both the computer and mobile device in the operating system of each such apparatus. In an example, the copying (by, for example, dragging and dropping) of a data element, such as document or file 220, from the computer 200 to the mobile device 255 results in the creation of a file on the mobile device 255, such as document or file 225, where the created file 225 is in a compatible format for the mobile device 255 and is represented by a mobile device icon. Such document may then also be presented on the display 260 of the mobile device 255, such as document or file 265. In a related example, a move (rather than copy) of document or file 220 to the mobile device further results in the removal or deletion of document or file 220 from the computer 200.

While these specific examples involve a document or file being copied or moved from the computer 200 to the mobile device 255, the same type of operations may provide for a copy or move of a document or file from the mobile device 255 to the computer 200. While the figures here show a mobile device window on the computer display, embodiments are not limited to this, and may include the presentation of a computer window on the mobile device display. While the screen size of a mobile device may limit the size of a window on the mobile device, such embodiment may be provided on a mobile device.

Figure 3:
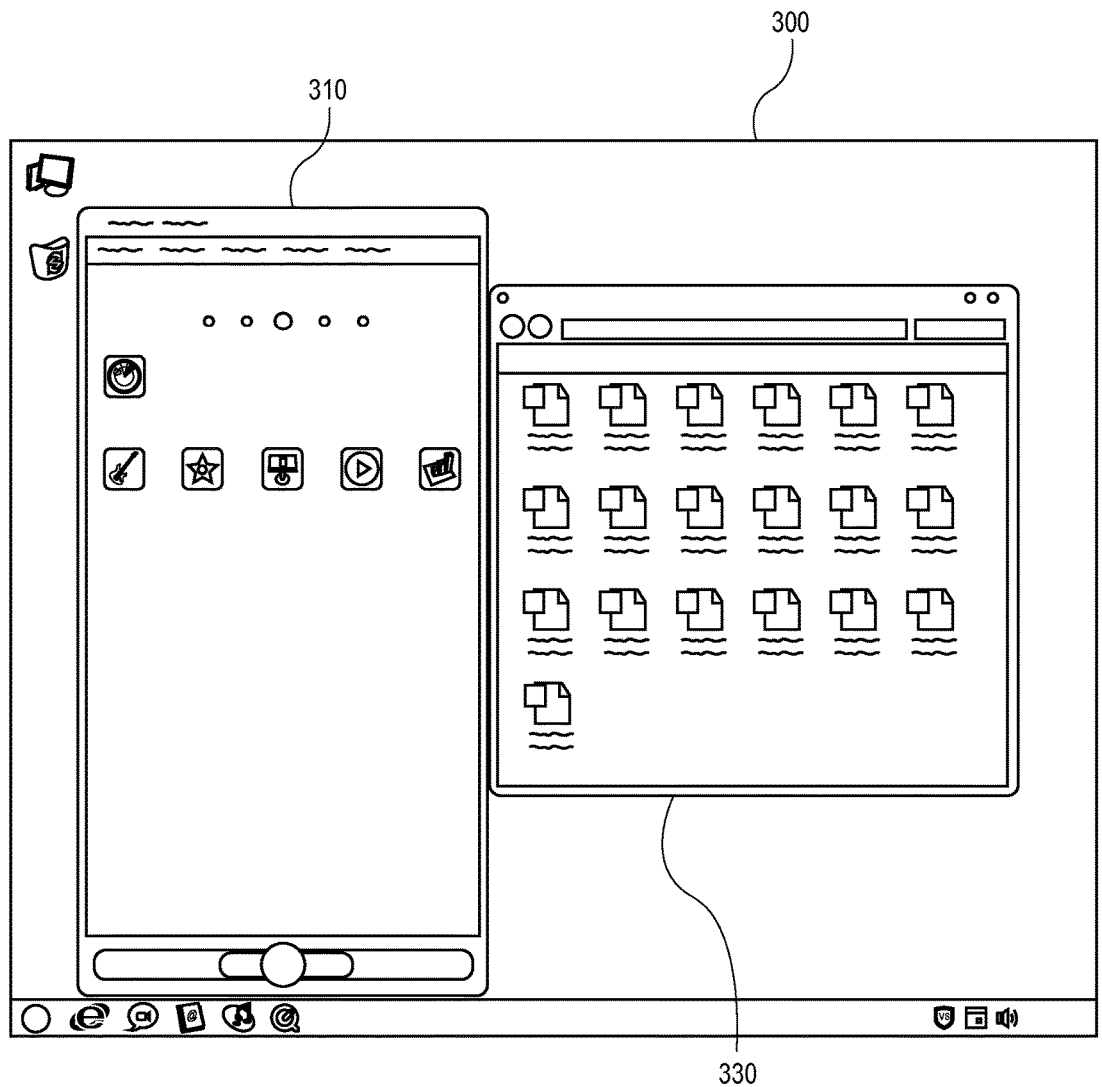
FIG. 3 is an illustration of an embodiment of an integrated mobile desktop.

FIG. 3 is an illustration of an embodiment of an integrated mobile desktop. In this illustration, a computer display 300 includes a mobile device window 310, wherein the mobile device window 310 represents a current status of the mobile device, and may include mobile device format icons representing data elements stored on the mobile device in a format compatible with an operating system of the mobile device. In some embodiments, the computer display 300 further includes native icons for files and documents stored on the computer in a format that is compatible with an operating system of the computer. In some embodiments, the mobile device window 310 represents an integrated mobile desktop to allow for data operations between the computer and the mobile device.

Figure 4:
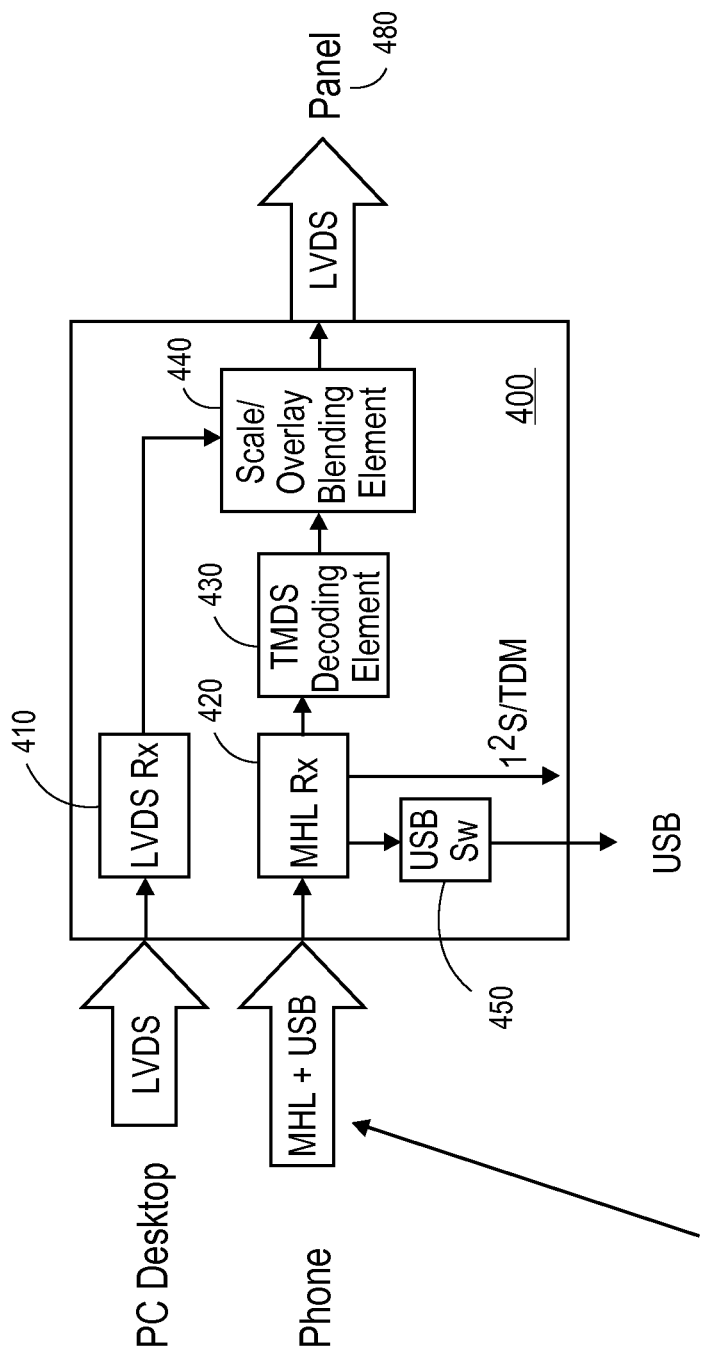
FIG. 4 is an illustration of an embodiment of a logic chip to provide for display of an integrated mobile desktop.

FIG. 4 is an illustration of an embodiment of a logic chip to provide for display of an integrated mobile desktop. In some embodiments, the logic chip may be a portion of an apparatus such as a personal computer or a display monitor for a computer. In some embodiments, a chip 400 provides for display of an integrated mobile desktop, such as the mobile device window 210 on the computer system display 205 illustrated in FIG. 2. In some embodiments, the chip 400 includes inputs for the computer display, shown as PC desktop LVDS (Low-Voltage Differential Signaling) input, and a mobile device, shown as a phone MHL input. As illustrated, audio/video data may include, but is not limited to, MHL, HDMI, DisplayPort, or other protocol data, and video and data may be combined, such as utilizing Thunderbolt or another interface, including future interfaces. The computer display input is received at an LVDS receiver 410 and the mobile device input is received at an MHL receiver 420. An output from the MHL receiver 420 is provided to TMDS decoding element 430, with decoded data and data from the LVDS receiver being provided to a scale/overlay blending element 440 to blend the computer and mobile device displays, resulting in an output to a display, such as an LVDS output to a computer display panel 480. As illustrated, the MHL receiver may further provide signals to a USB switch 450 for non-audio visual data and to $I^2S$/TDM (Inter-IC Sound/Time Division Multiplexing) for audio data. While FIG. 4 provides an implementation for a computer and mobile device, embodiments are not limited to particular data protocols or formats, such as LVDS and MHL.

In some embodiments, the logic device provides protection for data such as secure video data on a mobile device by separating such data from other computer elements. Regardless of the PC operating system design, HDCP content is protected from of software attack or hacking, because a memory component (not illustrated in FIG. 4) associated with the logic chip is isolated from the system CPU and memory, whether the memory component is on-die, on-package, or separate. For this reason, such contents could generally only be accessed by viewing such data onscreen, or by utilizing specialized and expensive logic analyzers to capture such contents, which is impractical in most cases.

Figure 5:
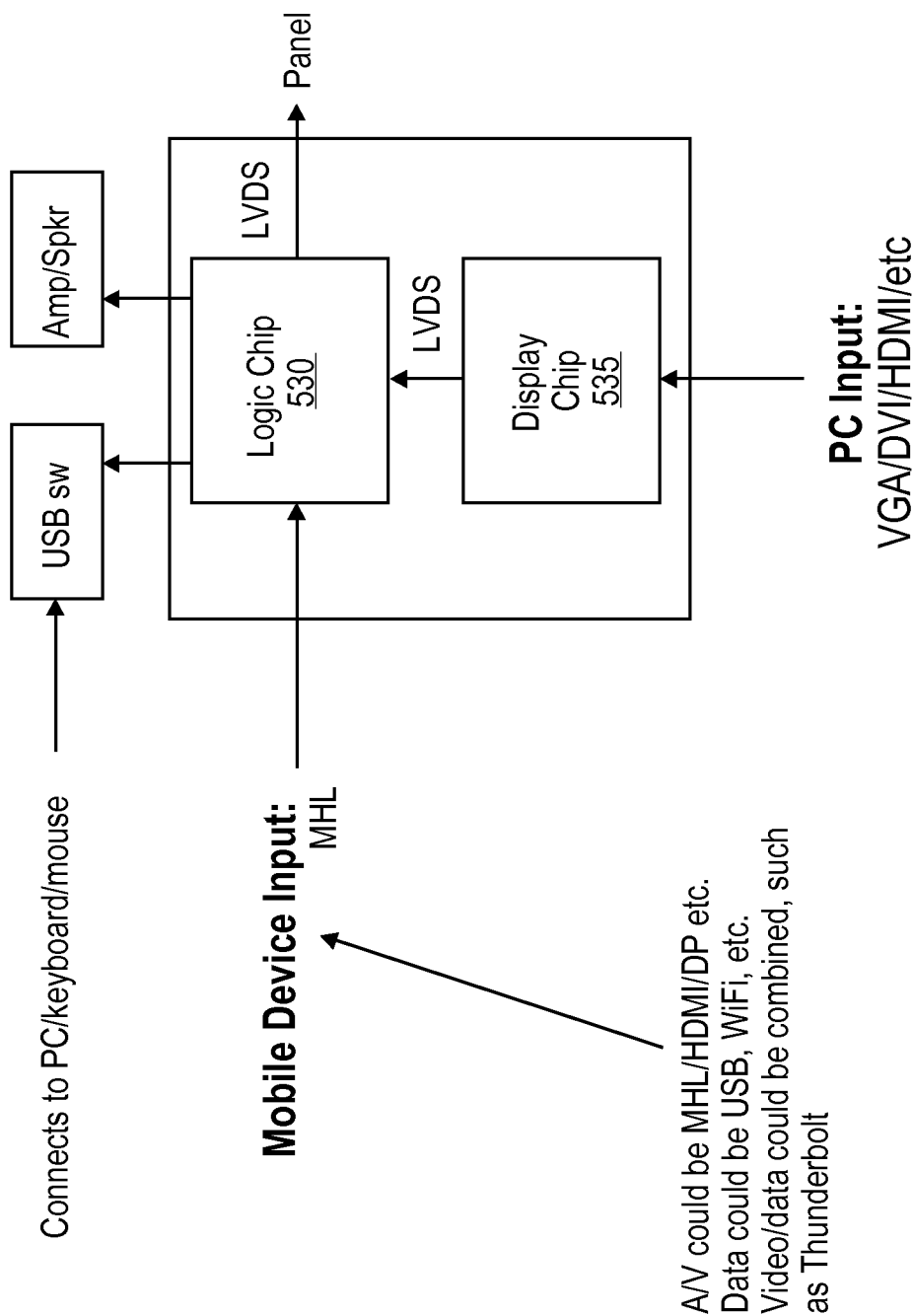
FIG. 5 is an illustration of a apparatus providing for an integrated mobile desktop.

FIG. 5 is an illustration of an apparatus providing for an integrated mobile desktop. In some embodiments, an apparatus may include a display monitor. In some embodiments, the apparatus includes a logic chip 530, such as logic chip 400 illustrated in FIG. 4, coupled with a display chip 535. In some embodiments, the logic chip 530 is operable to generate an integrated mobile desktop display to a display panel.

As illustrated is FIG. 5, a mobile device input, such as MHL or other data (where audio/video data may include, but is not limited to, MHL, HDMI, DisplayPort, or other protocol data, and video and data may be combined, such as utilizing Thunderbolt or another interface, is received by the logic chip 530. The display chip receives PC input, which may be in the form of VGA (Video Graphics Array), DVI (Digital Visual Interface), HDMI, or other protocol data, and provides a video output to the logic chip, such as the illustrated LVDS output. The logic chip 530 is operable to provide audio data to an amplifier or speaker, and other data to a USB switch or other data bus, where the USB may connect to a personal computer and to human interface devices, such as a keyboard or mouse.

Figure 6:
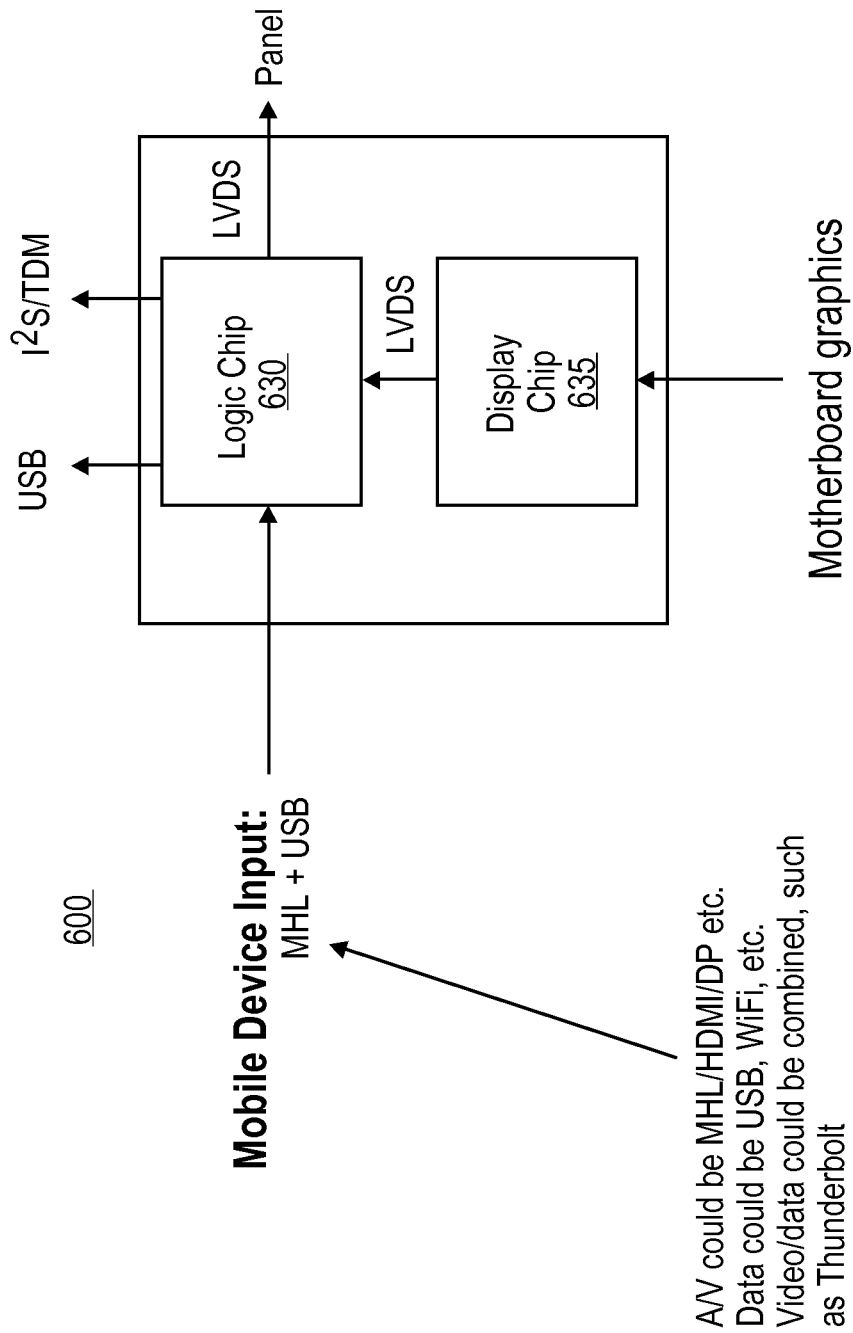
FIG. 6 is an illustration of a apparatus providing for an integrated mobile desktop.

FIG. 6 is an illustration of an apparatus providing for an integrated mobile desktop. In some embodiments, an apparatus or system may include a laptop personal computer. In some embodiments, the apparatus or system 600 includes a logic chip 630, such as logic chip 400 illustrated in FIG. 4, coupled with a display chip 635, where the logic chip 630 is operable to generate an integrated mobile desktop display to a display panel, the display chip 635 similarly to FIG. 5 generating an LVDS output that is provided to the logic chip 630. In some embodiments, the display chip 600 may receive motherboard graphics data from the motherboard of the apparatus or system. In some embodiments, the logic chip may receive audio/video (such as MHL) data and USB data (where audio/video data may include, but is not limited to, MHL, HDMI, DisplayPort, or other protocol data, and video and data may be combined, such as utilizing Thunderbolt or another interface).

Figure 7:
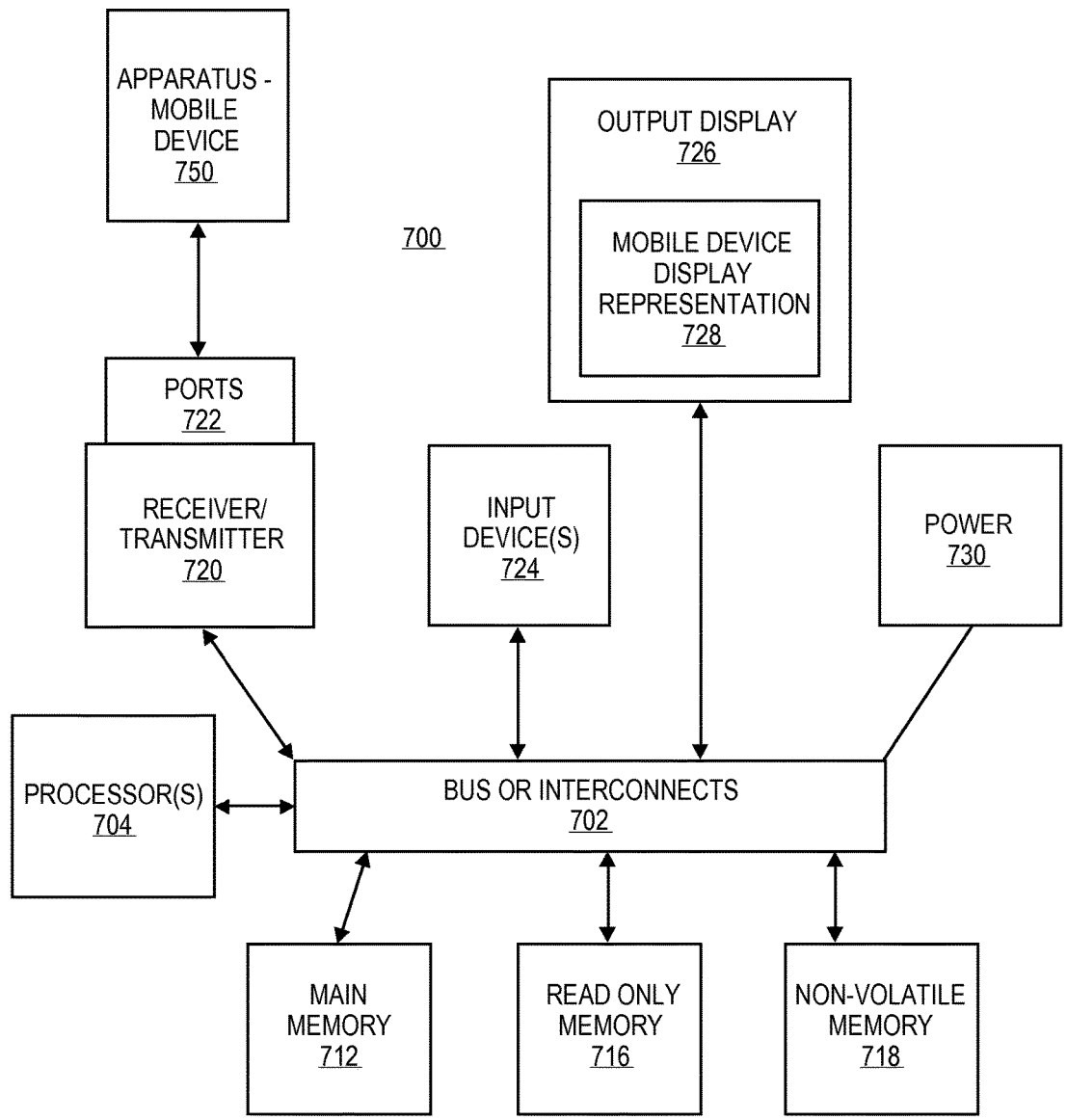
FIG. 7 is an illustration of a computer including an integrated mobile desktop platform for an attached mobile device.

FIG. 7 is an illustration of a computer including an integrated mobile desktop platform for an attached mobile device. In this illustration, certain standard and well-known components that are not germane to the present description are not shown. While the description herein refers to the elements of a computer, the described elements are generally applicable to a mobile device as well. In some embodiments, the computer 700 comprises a bus or interconnects 702 or other communication means for transmission of data. The computer 700 may include a processing means, such as one or more processors 704 coupled with the interconnect 702 for processing information. The processors 704 may comprise one or more physical processors and one or more logical processors. The bus or interconnect 702 is illustrated as a single interconnect for simplicity, but may represent multiple different interconnects or buses and the component connections to such interconnects may vary. The interconnect 702 shown in FIG. 7 is an abstraction that represents any one or more separate physical buses, point-to-point connections, or both connected by appropriate bridges, adapters, or controllers.

In some embodiments, the computer 700 further comprises a random access memory (RAM) or other dynamic storage device or element as a main memory 712 for storing information and instructions to be executed by the processors 704. RAM memory may include dynamic random access memory (DRAM). In some embodiments, memory of the computer may further include certain registers or other special purpose memory.

The computer 700 may include a read only memory (ROM) 716 or other static storage device for storing static information and instructions for the processors 704. The computer 700 may include one or more non-volatile memory elements 718 for the storage of certain elements, including, for example, flash memory, hard disk drive, or solid-state drive.

One or more transmitters or receivers 720 may also be coupled to the interconnect 702. In some embodiments, the receivers or transmitters 720 may be coupled to one or more ports 722, where the ports may include, for example, one or more HDMI™ (High-Definition Multimedia Interface) ports, and one or more MHL™ (Mobile High-Definition Link) ports. In some embodiments, another apparatus, such as a mobile device 750, may be connectable to the computer 700 via a port 722.

In some embodiments, the computer 700 includes one or more input devices 724, where the input devices include one or more of a keyboard, mouse, touch pad, voice command recognition, gesture recognition, or other device for providing an input to a computing system.

The apparatus 700 may also be coupled via the interconnect 702 to an output display device 726. In some embodiments, the display 726 may include a liquid crystal display (LCD) or any other display technology, for displaying information or content to a user. In some environments, the display 726 may include a touch-screen that is also utilized as at least a part of an input device. In some environments, the display 726 may be or may include an audio device, such as a speaker for providing audio information.

In some embodiments, the computer 700 is operable to provide an integrated desktop for a connected apparatus, such as mobile device 750. In some embodiments, the output display 726 includes a mobile device display representation 728, wherein the mobile device display representation 728 may include the mobile device window 210 within a computer system display illustrated in FIG. 2. In some embodiments, the computer 700 or display monitor includes a logic chip providing for the generation of the mobile device display representation, such as logic chip 400 illustrated in FIG. 4.

The apparatus 700 may also comprise a power device or apparatus 730, which may comprise a power supply, a battery, a solar cell, a fuel cell, or other system or device for providing or generating power. The power provided by the power device or system 730 may be distributed as required to elements of the apparatus 700.

Figure 8:
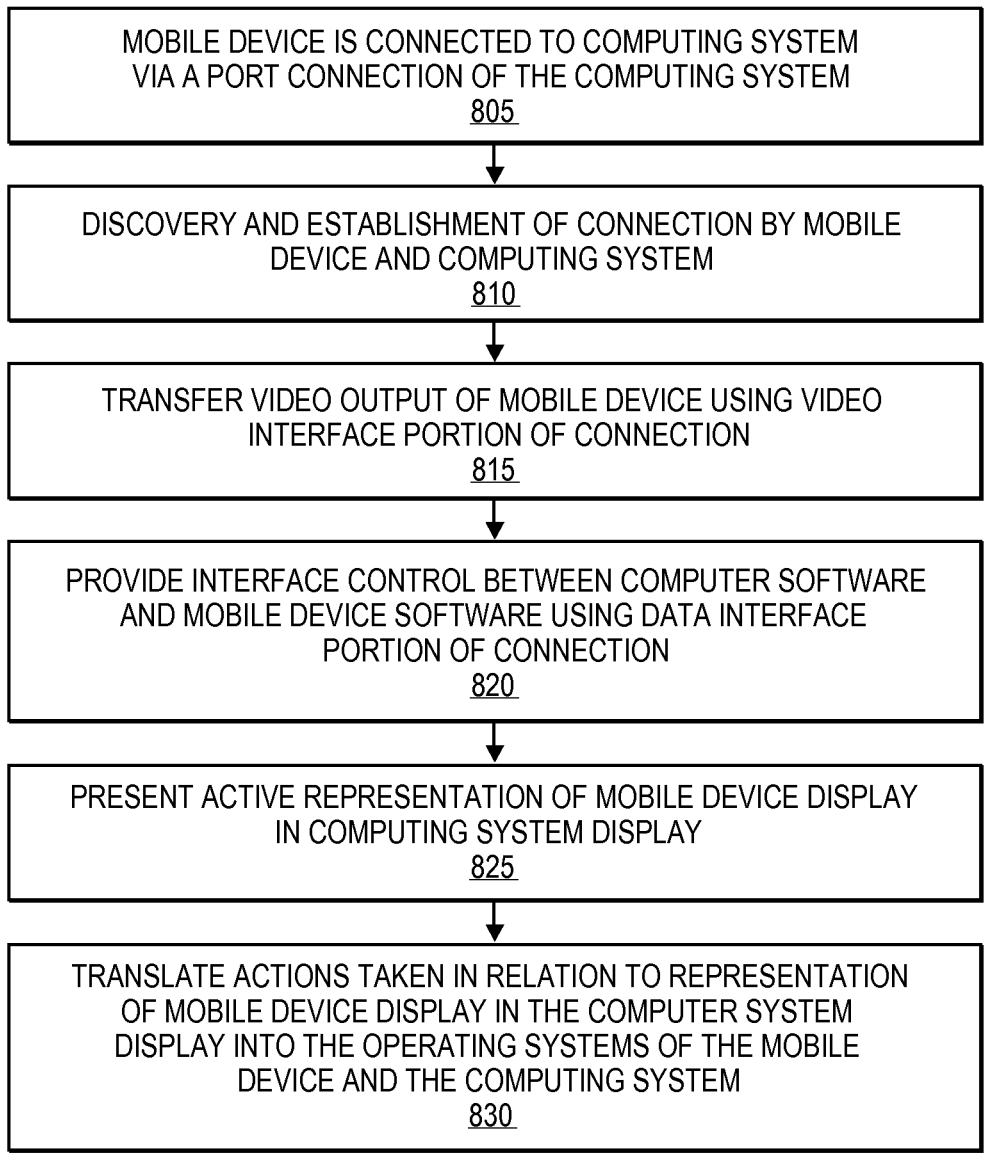
FIG. 8 is a flowchart to illustrate a method for integrated mobile desktop operation.

FIG. 8 is a flowchart to illustrate a method for integrated mobile desktop operation. In some embodiments, a first device is connected to a second device, such as a mobile device being connected to a port connection of a computing system 805. In some embodiments, a process of discovery and establishment of connection is conducted by the mobile device and the computing system 810. In some embodiments, the computing system establishes an integrated mobile device desktop operable to provide operations including manipulate data on the mobile devise using computer system controls, and transfer data between the mobile device and the computing system.

In some embodiments, the mobile device and computing system are operable to transfer data between the apparatuses, including transfer of audio-video data from the mobile device to the computing system using a video interface portion of the connection 815 and to provide interface control between computer software and mobile device software using a data interface portion of the connection 820.

In some embodiments, an active representation of the mobile device display is provided in the computer device display 825. In some embodiments, actions taken in relation to the representation of the mobile device display are translated into the operating systems of the mobile device and the computing system 830. In some embodiments, the actions include manipulation of the mobile device using controls of the computing system, and transfer of data between the mobile device and the computing system using the representation of the mobile device display in the computing system display.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

In some embodiments, an apparatus includes: a display chip to receive graphical data and produce video display signals; and a logic chip to receive data from a second apparatus and the video display signals from the display chip to generate a display including at least a portion for a representation of a display of the second apparatus. In some embodiments, the logic chip provides for integration of operations for the apparatus and the second apparatus using the generated display.

In some embodiments, the operations include manipulation of data on the second apparatus using controls for the apparatus or a computer coupled with the apparatus. In some embodiments, the operations include transfer of data between the second apparatus and the apparatus or a computer coupled with the apparatus.

In some embodiments, the apparatus is a personal computer, and in some embodiments, the second apparatus is a mobile device.

In some embodiments, the apparatus is a display monitor to be coupled with a computer.

In some embodiments, the logic chip provides protection for secure video data by separating the secure video data from other data. In some embodiments, the apparatus further includes a memory component associated with the logic chip, the memory component being separated from a CPU and memory of the apparatus.

In some embodiments, a logic chip includes: a first receiver to receive video display signals for a first apparatus; a second receiver to receive data from a second apparatus, the second receiver to separate video data and other data from the second apparatus; a decoding element to decode the video data of the second apparatus to generate video display signals for the second apparatus; and a blending element to combine the video display signals for the first apparatus with the video display signals for the second apparatus to present an integrated representation of the first apparatus and the second apparatus.

In some embodiments, the first apparatus is a computer. In some embodiments, the second apparatus is a mobile device.

In some embodiments, the second receiver separates the other data between audio data and non-audio data. In some embodiments, the logic chip further includes a switch, the second receiver directing the non-audio data to the switch.

In some embodiments, a method includes: discovering by a first device a second device connected to a port of the first device; establishing a connection between the first device and the second device; receiving data including video output data of the second device at the first device using a video interface portion of the connection; providing interface control between the first device and the second device using a data interface portion of the connection; presenting an active representation of a display of the second device in a display of the first device; and translating one or more actions in using the display of the first device into an operating system of the first device and an operating system of the second device.

In some embodiments, the method further includes separating the received data between the video output and other data.

In some embodiments, the one or more actions include manipulation of the second device using controls of the first device. In some embodiments, the one or more actions include transfer of data between the first device and the second device using the active representation of the display of the second device in the display of the first device.

In some embodiments, the first apparatus is a computer. In some embodiments, the second apparatus is a mobile device.

In some embodiments, a non-transitory computer-readable storage medium having stored thereon data representing sequences of instructions that, when executed by a processor, cause the processor to perform operations including: discovering by a first device a second device connected to a port of the first device; establishing a connection between the first device and the second device; receiving data including video output data of the second device at the first device; providing interface control between the first device and the second device using a data interface portion of the connection; presenting an active representation of a display of the second device in a display of the first device; and translating one or more actions in using the display of the first device into an operating system of the first device and an operating system of the second device.

What is claimed is:

1. An apparatus comprising:
    a display chip configured to:
        receive graphical data from a component of the apparatus using a first video communication protocol, and
        produce video display signals based on the received graphical data;
    a logic chip separate from the display chip to receive data from a second apparatus using a second video communication protocol and the video display signals from the display chip using a third video communication protocol to generate a display including at least a portion for a representation of a display of the second apparatus; and
    a memory component accessible by the logic chip to store or retrieve High-bandwidth Digital Content Protection (HDCP) data, the memory component separate from a memory of the apparatus and not accessible by a central processing unit of the apparatus;
    wherein the logic chip provides for integration of operations for the apparatus and the second apparatus using the generated display.

2. The apparatus of claim 1, wherein the operations include manipulation of data on the second apparatus using controls for the apparatus or a computer coupled with the apparatus.

3. The apparatus of claim 1, wherein the operations include transfer of data between the second apparatus and the apparatus or a computer coupled with the apparatus.

4. The apparatus of claim 1, wherein the apparatus is a personal computer.

5. The apparatus of claim 1, wherein the second apparatus is a mobile device.

6. The apparatus of claim 1, wherein the apparatus is a display monitor to be coupled with a computer.

7. The apparatus of claim 1, wherein the logic chip provides protection for secure video data by separating the secure video data from other data.

8. The apparatus of claim 1, wherein the first video communication protocol is one of Video Graphics Array (VGA), Digital Visual Interface (DVI) or High-Definition Multimedia Interface (HDMI).

9. The apparatus of claim 8, wherein the second video communication protocol is Mobile High-definition Link (MHL).

10. The apparatus of claim 9, wherein the third video communication protocol uses low-voltage differential signaling (LVDS).

11. The apparatus of claim 1, wherein the first video communication protocol uses low-voltage differential signaling (LVDS).

12. The apparatus of claim 11, wherein the second communication protocol is one of Mobile High-definition Link (MHL), High-Definition Multimedia Interface (HDMI) or display port (DP).

13. A method comprising:
    receiving, by a display chip of a first device, graphical data from a component of the first device using a first video communication protocol;
    producing, by the display chip of the first device, video display signals based on the received graphical data;
    discovering, by a logic chip of the first device separate from the display chip, a second device connected to a port of the first device;

establishing a connection between the logic chip of the first device and the second device using a second video communication protocol;

receiving, by the logic chip of the first device, data from the second device using the second video communication protocol and the video display signals from the display chip of the first device using a third video communication protocol;

storing High-bandwidth Digital Content Protection (HDCP) data of the data received from the second device in a memory component of the first device accessible by the logic chip, the memory component separate from a memory of the first device;

preventing access to the HDCP data by a central processing unit of the first device;

providing interface control between the first device and the second device using the second video communication protocol;

generating, by the logic chip of the first device based on the data received from the second apparatus and the video display signals, an active representation of a display of the second device for presenting in a display of the first device; and translating one or more actions in using the display of the first device into an operating system of the first device and an operating system of the second device.

14. The method of claim 13, further comprising separating the received data between the video output data and other data.

15. The method of claim 13, wherein the one or more actions include manipulation of the second device using controls of the first device.

16. The method of claim 13, wherein the one or more actions include transfer of data between the first device and the second device using the active representation of the display of the second device in the display of the first device.

17. The method of claim 13, wherein the first apparatus is a computer.

18. The method of claim 13, wherein the second apparatus is a mobile device.

19. The method of claim 13, wherein the first video communication protocol is one of Video Graphics Array (VGA), Digital Visual Interface (DVI) or High-Definition Multimedia Interface (HDMI).

20. The method of claim 19, wherein the second video communication protocol is Mobile High-definition Link (MHL).

* * * * *